United States Patent Office 3,803,112
Patented Apr. 9, 1974

3,803,112
PROCESS FOR THE PRODUCTION OF POLYMERS
Friedrich Engelhardt, Frankfurt am Main-Fechenheim, Steffen Piesch, Oberursel, Taunus, Erwin Herrmann, Frankfurt am Main-Fechenheim, and Dieter Plath, Bischofsheim, Kreis Hanau, Germany, assignors to Casella Farbwerke Mainkur Aktiengesellschaft, Frankfurt am Main-Fechenheim, Germany
No Drawing. Filed June 2, 1972, Ser. No. 259,042
Claims priority, application Germany, June 5, 1971, P 21 28 012.6
Int. Cl. C08f 1/62, 3/90
U.S. Cl. 260—89.7 R        12 Claims

ABSTRACT OF THE DISCLOSURE

Compounds of the formula $$Q-R-SO_2-\underset{R^1}{\underset{|}{CH}}-X$$

wherein

R is an arylene, aralkylene, hetarylene, alkylene, cycloalkylene, alkenylene, cycloalkylene or alkinylene radical;

Q is hydrogen or $$-SO_2-\underset{R^5}{\underset{|}{CH}}-X$$

$R^5$ is hydrogen, a carboxylate base addition salt radical or an aryl, aralkyl, hetaryl, alkyl, cycloalkyl, alkenyl, cycloalkenyl, alkinyl, carboxyl, —COOR$^2$, —CONH$_2$,

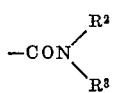

or —CN radical;

X is —NHCOR$^4$, —NHSO$_2$R$^2$, —SR$^2$, —S—COOH, —S—CONH$_2$,

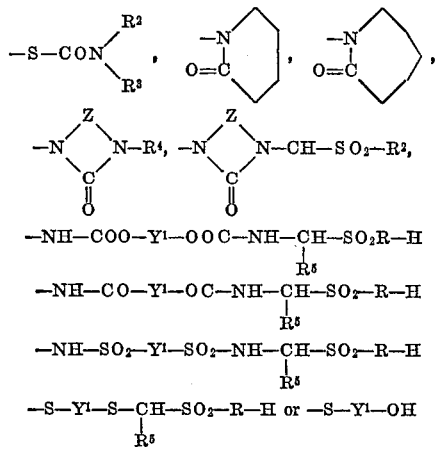

—NH—COO—Y$^1$—OOC—NH—$\underset{R^5}{\underset{|}{CH}}$—SO$_2$R—H

—NH—CO—Y$^1$—OC—NH—$\underset{R^5}{\underset{|}{CH}}$—SO$_2$—R—H

—NH—SO$_2$—Y$^1$—SO$_2$—NH—$\underset{R^5}{\underset{|}{CH}}$—SO$_2$—R—H

—S—Y$^1$—S—$\underset{R^5}{\underset{|}{CH}}$—SO$_2$—R—H or —S—Y$^1$—OH $R^2$ and $R^3$ are separately an aryl, aralkyl, hetaryl, alkyl, cycloalkyl, alkenyl, cycloalkenyl or alkinyl radical;

$R^4$ is defined by the group defining $R^2$ and $R^3$ or may also be hydrogen;

$Y^1$ is an alkylene, cycloalkylene or arylene radical;

Y is defined by the group defining $Y^1$ or may also be a direct bond;

Z is an alkylene, hydroxyalkylene or

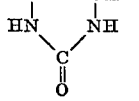

radical and $R^1$ is defined by the group defining $R^5$ or may also be the radical

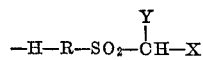

when Q is hydrogen are used as reducing component of a redox catalyst system in the polymerization of olefinically unsaturated monomers.

---

U.S. Pat. 3,476,717 discloses a process for the preparation of homopolymers and copolymers from olefinically unsaturated compounds with the aid of a redox catalyst system wherein certain sulfonylmethylcarbamic acid esters are used as reducing components of the redox catalyst system. It has now been found that the use of compounds of Formula I below as the reducing component of a redox catalyst system offers advantages. Thus, the present invention relates to a process for the preparation of homopolymers and copolymers from olefinically unsaturated monomers with the aid of a redox catalyst system. The novel process is characterized in that a compound of the formula $$Q-R-SO_2-\underset{R^1}{\underset{|}{CH}}-X \qquad (I)$$

is used as the reducing component of the redox catalyst system. In said Formula I:

R is an arylene, aralkylene, hetarylene, alkylene, cycloalkylene, alkenylene, cycloalkylene or alkinylene radical;

Q is hydrogen or $$-SO_2-\underset{R^5}{\underset{|}{CH}}-X$$

$R^5$ is hydrogen, a carboxylate base addition salt radical or an aryl, aralkyl, hetaryl, alkyl, cycloalkyl, alkenyl, cycloalkenyl, alkinyl, carboxyl, —COOR$^2$, —CONH$_2$,

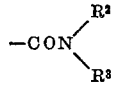

or —CN radical;

X is —NHCOR$^4$, —NHSO$_2$R$^2$, —SR$^2$, —S—COOH, —S—CONH$_2$,

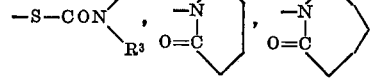

—NH—COO—Y$^1$—OOC—NH—$\underset{R^5}{\underset{|}{CH}}$—SO$_2$R—H,

—NH—CO—Y$^1$—OC—NH—$\underset{R^5}{\underset{|}{CH}}$—SO$_2$—R—H,

—NH—SO$_2$—Y$^1$—SO$_2$—NH—$\underset{R^5}{\underset{|}{CH}}$—SO$_2$—R—H,

—S—Y$^1$—S—$\underset{R^5}{\underset{|}{CH}}$—SO$_2$—R—H or —S—Y$^1$—OH;

$R^2$ and $R^3$ are separately an aryl, aralkyl, hetaryl, alkyl, cycloalkyl, alkenyl, cycloalkenyl or alkinyl radical;

$R^4$ is defined by the group defining $R^2$ and $R^3$ or may also be hydrogen;

Y¹ is an alkylene, cycloalkylene or arylene radical;
Y is defined by the group defining Y¹ or may also be a direct bond;
Z is an alkylene, hydroxyalkylene or

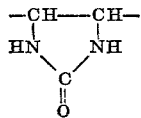

radical and
R¹ is defined by the group defining R⁵ or may also be the radical

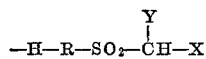

when Q is hydrogen.

Suitable monomers for the preparation of the homopolymers and copolymers are, for example, acrylic acid, methacrylic acid, their salts, esters and amides, styrene, halides such as 2,5-dichlorostyrene, α-methylstyrene, vinyltoluene, allylbenzene, vinylcarbazole, vinylmethylketone, acrylonitrile, vinylidene cyanide, methylolacrylamide or methacrylamide and their reaction products with amines and alcohols, vinyl pyrrolidone, carbazole, esters of unsaturated alcohols such as vinyl acetate, dialkyl phthalate, ethylene and propylene.

A novel compound of Formula I is used as the reducing component of the redox catalyst system. The oxidizing components may be, for example, air, oxygen or inorganic or organic per compounds such as butyl peroxide, di-tert. butyl peroxide, benzoyl peroxide, lauroyl peroxide, acetyl peroxide, propane sulfonyl hydroperoxide, dicyclohexyl percarbonate, cumene hydroperoxide, methylethylketone peroxide, hydrogen peroxide or potassium, sodium or ammonium peroxydisulfate.

The preparation of the polymers may be by precipitation, emulsion, solution or bulk polymerization. The polymerization is carried out in a manner known per se at temperatures between —10 to 120° C. and preferably between 0 and 80° C. Higher molecular weights and polymer yields are achieved by the additions of chloride ions.

The concentration of the compounds of Formula I used is preferably 0.02 to 3% by weight and the concentration of the oxidizing component is preferably 0.25 to 2% by weight based on the monomer or monomer mixture employed.

It may be suitable to use as the reducing component of the redox catalyst system a mixture of two or more compounds of Formula I.

With monomer reactions of more than 90%, homogeneous polymerides are obtained having a high molecular weight. Particularly advantageous results are achieved with the homopolymers and copolymers of acrylamide in aqueous solution, as well as by precipitation polymerization thereof from tertiary butanol. Homopolymers prepared in this manner surpass the polymers prepared according to known processes by virtue of their water solubility and higher molecular weight. In the polymerization from aqueous solution, non-flowable gels are obtained which, even after an extended period of time, retain their shape.

In the use of the novel compounds of Formula I as the reducing component in redox catalyst systems for the preparation of homopolymers and copolymers of olefinically unsaturated compounds, air suffices in many instances as the oxidizing component, so that further oxidizing agents may be omitted. This is particularly useful in the preparation of protective and/or decorative coatings by the polymerization of thin films of monomeric or oligomeric liquid or dissolved unsaturated compounds; the unsaturated compounds may also contain polymers in dissolved, steeped or suspended form. For the preparation of such protective and/or decorative coatings, one may employ, for example, in monomeric or oligomeric form, styrene, styrene halide, acrylic acid esters or methacrylic acid esters of monohydric or polyhydric alcohols, vinyltoluene, allyl or methallyl esters of polyfunctional carbonic acids, acrylic acid, methacrylic acid, vinyl pyrrolidone, vinyl carbazole, esters of unsaturated alcohols such as vinyl acetate, N-vinylmethylacetamide, vinylidene cyanide, vinylmethylketone, acrylonitrile, vinylidene chloride and vinyl ether, if necessary with the addition of polyfunctional, unsaturated compounds as crosslinking agents such as trisacryloylperhydrotriazine or triallylisocyanurate.

There may also be used compositions of two or more olefinically unsaturated compounds. Compositions of saturated or unsaturated polyesters on the one hand and olefinically unsaturated monomers on the other hand may also be used. Suitable as such are, for example, styrene, acrylic acid esters, methacrylic acid esters and vinyltoluene.

Polymers which may be contained in the monomeric or oligomeric starting substances in dissolved, steeped or suspended form are, for example: polymers of styrene, styrene halides, acrylic acid esters, methacrylic acid esters, vinyltoluene, vinylacetate and copolymers thereof.

Polymerization for the preparation of the protective and/or decorative coatings is carried out using the compounds of Formula I at temperatures between —10 and 120° C. and preferably between 0 and 80° C. The concentration of the compounds of Formula I preferably is between about 0.02 and 3.0% by weight, based on the monomer employed. The addition of a special oxidation component is not required. However, the addition of an accelerator is advantageous.

The most useful accelerators include copper and cuprous and cupric compounds such as cupric acetate, cupric acetylacetonate, cuprous chloride, cupric chloride, cupric fluoride, cupric bromide, cupric nitrate, cuprous rhodanide, cupric sulfate, copper chromite, copper ferrocyanide, cuprous oxide and cupric oxide. Furthermore, compounds of silver, cobalt, manganese, nickel, vanadium, chromium, molybdenum, mercury, iron, borine, bismuth, praseodymium, zinc, selenium and titanium are useful.

The polymerization products are utilized immediately for the preparation of thin coatings. For example, metals such as iron, steel, aluminum and copper; concrete glass, wood and other substances may be coated. These polymerization products may also serve for the preparation of permanent street markings, foundation surfacers, joint sealing compounds and adhesives. They have the advantage that in a short time they have a completely non-tacky surface. This is, in many cases, of great importance, e.g., in the preparation of street markings.

Compounds of the following structures are embraced by Formula I:

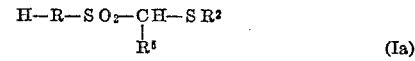
(Ia)

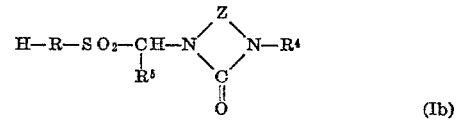
(Ib)

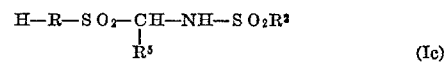
(Ic)

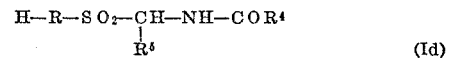
(Id)

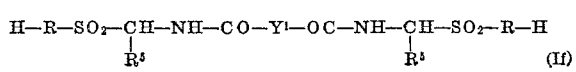
(Ie)

H—R—SO₂—CH—NH—CO—Y¹—OC—NH—CH—SO₂—R—H
        |                              |
        R⁵                             R⁵
(If)

$$H-R-SO_2-\underset{R^5}{CH}-NH-SO_2-Y^1-O_2S-NH-\underset{R^5}{CH}-SO_2-R-H \quad (Ig)$$

$$H-R-SO_2-\underset{R^5}{CH}-N\underset{\underset{O}{\overset{\|}{C}}}{\overset{Z}{\diagdown}}N-\underset{R^5}{CH}-SO_2-R-H \quad (Ih)$$

$$H-R-SO_2-\underset{R^5}{CH}-S-Y^1-S-\underset{R^5}{CH}-SO_2-R-H \quad (Ii)$$

$$\begin{array}{c} H-R-SO_2-\underset{|}{CH}-NH-CO-R^4 \\ Y \\ H-R-SO_2-\underset{|}{CH}-NH-CO-R^4 \end{array} \quad (Ik)$$

$$\begin{array}{c} H-R-SO_2-\underset{|}{CH}-NH-SO_2-R^2 \\ Y \\ H-R-SO_2-\underset{|}{CH}-NH-SO_2-R^2 \end{array} \quad (Il)$$

$$\begin{array}{c} H-R-SO_2-\underset{|}{CH}-S-R^2 \\ Y \\ H-R-SO_2-\underset{|}{CH}-S-R^2 \end{array} \quad (Im)$$

$$\begin{array}{c} H-R-SO_2-CH-N\diagup^Z\diagdown NH \\ | \quad\quad\quad\quad \diagdown\underset{O}{\overset{\|}{C}}\diagup \\ Y \\ | \\ H-R-SO_2-CH-N\diagup^{\overset{O}{\overset{\|}{C}}}\diagdown NH \\ \diagdown_Z\diagup \end{array} \quad (In)$$

$$R^2-SO_2-NH-\underset{R^5}{CH}-SO_2-R-SO_2-\underset{R^5}{CH}-NH-SO_2-R^2 \quad (Io)$$

$$R^2-CO-NH-\underset{R^5}{CH}-SO_2-R-SO_2-\underset{R^5}{CH}-NH-CO-SO_2-R^2 \quad (Ip)$$

$$R^2-S-\underset{R^5}{CH}-SO_2-R-SO_2-\underset{R^5}{CH}-S-R^2 \quad (Iq)$$

$$HN\diagup^Z\diagdown\underset{\underset{O}{\overset{\|}{C}}}{N}-\underset{R^5}{CH}-SO_2-R-SO_2-\underset{R^5}{CH}-N\diagdown_{\underset{O}{\overset{\|}{C}}}\diagup^Z NH \quad (Ir)$$

$$\begin{array}{c} H-R-SO_2-\underset{R^5}{CH}-N\diagdown\square_{O=} \\ H-R-SO_2-\underset{|}{CH}-N\diagup^{O=}\square \\ Y \\ H-R-SO_2-\underset{|}{CH}-N\diagdown\square_{O=} \end{array} \quad (Is)\quad(It)$$

$$\square_{=O}N-\underset{R^5}{CH}-SO_2-R-SO_2-\underset{R^5}{CH}-N\square_{O=} \quad (Iu)$$

Particularly advantageous results are achieved with such compounds wherein $R^1$ or $R^5$ is COOH or a carboxylate base addition salt radical.

In Formula I, the alkyl radicals for $R^1$, $R^2$, $R^3$, $R^4$, $R^5$ and the alkenyl radical —R— may be straight chained or branched and have, for example, 1 to 8 and preferably 1 to 4 carbon atoms.

Alkenyl or alkinyl radicals for $R^1$, $R^2$, $R^3$, $R^4$, $R^5$ and the alkenylene or alkinylene radicals —R— preferably contain 1 to 4 carbon atoms. Cycloalkyl and cycloalkenyl or cycloalkylene or cycloalkenylene radicals preferably contain 4 to 8 carbon atoms.

Hetaryl or hetarylene radicals preferably are derived from thiophene, pyrrole, carbazole, pyridine and phenothiazine.

Preferred as aryl or arylene radicals are phenyl and naphthyl radicals and phenylene and naphthylene radicals. The aralkyl radicals or aralkylene radicals are preferably derived from toluene and ethylbenzene.

The aryl, aralkyl, alkyl, alkenyl, alkinyl, cycloalkyl, cycloalkenyl, arylene, aralkylene, alkylene, alkenylene, alkinylene, cycloalkylene and cycloalkenylene radicals may also be singly or multiply substituted. When multiply substituted, the substituents may be alike or dissimilar. Preferred substituents include, for example, Cl, Br, F, $CF_3$, CN, $NO_2$, OH, COOH, —$COOR^2$, —$CONH_2$, $$-CON\diagup^{R^3}\diagdown_{R^3}$$

alkoxy preferably having 1 to 4 carbon atoms, alkanoyl preferably having 1 to 4 carbon atoms, alkanoylamino preferably having 1 to 4 carbon atoms, alkanoyloxy preferably having 1 to 4 carbon atoms, aroyl, aroyloxy and trifluoromethyloxy. Particularly for phenyl radicals, methylenedioxy is also considered as a substituent.

The preparation of compounds of Formula I may be accomplished by, for example, three different methods. These three methods are first described for the preparation of compounds of Formulae Ia, Ib, Ic, Id and Is.

METHOD A

In this method, sulfinic acid of Formula II or a salt of a sulfinic acid, preferably the sodium or potassium salt, is reacted with an aldehyde of Formula III in a suitable solvent to obtain an oxysulfonyl compound of Formula IV:

$$(1) \quad H-R-SO_2H + \underset{R^5}{CHO} \longrightarrow H-R-SO_2-\underset{R^5}{CHOH}$$
$$\quad\quad (II) \quad\quad (III) \quad\quad\quad\quad (IV)$$

The oxysulfonyl compound of Formula IV, if necessary after its isolation, is then reacted with a compound of Formula V to obtain Iv:

$$(2) \quad H-R-SO_2-\underset{R^5}{CHOH} + H-T \longrightarrow H-R-SO_2-\underset{R^5}{CH-T}$$
$$\quad\quad (IV) \quad\quad (V) \quad\quad\quad\quad (Iv)$$

In this connection, T is the radical —$NHCOR^4$,

—$NHSO_2R^2SR^2$, $$-S-CH_2-C\diagup^O\diagdown_{OH}, -S-CH_2-C\diagup^O\diagdown_{NH_2}, -S-CH_2-C\diagup^O\diagdown_{N\diagup^R\diagdown_R}$$

$$-N\square_{O=}, -N\square^{O=}, -N\diagup^Z\diagdown_{\underset{O}{\overset{\|}{C}}}N-R^4 \text{ or } -S-Y-OH$$

Thermally, the oxysulfonyl compound of Formula IV is, as a rule, not particularly stable, so that it is generally best not to exceed reaction temperatures of 50° C.

METHOD B

In this method, a sulfinic acid of Formula II, an aldehyde of Formula III and a compound of Formula V are simultaneously reacted in a suitable solvent:

(3)

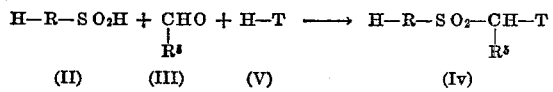

Used as solvents in this reaction are preferably glacial acetic acid, formic acid, alkanols having 1 to 4 carbon atoms, water, dimethylformamide, dimethylsulfoxide, or solvent mixtures, particularly mixtures of the aforesaid solvents. Normally, the three components are stirred in the solvent used at temperatures between 5 and 100° C. The sulfinic acid may also be used in the form of a salt, e.g., its potassium or sodium salt. After some time, the novel compounds are precipitated in crystalline form. After their isolation, they may be recrystallized from a suitable solvent.

This process generally gives good yields. It proceeds unsatisfactorily, however, in some instances, particularly when the reaction between the compound of Formula IV, which is formed as an intermediate in this method and the compound of Formula V proceeds so slowly that the compound of Formula IV decomposes at the reaction temperature.

METHOD C

In this method a compound of Formula V is first reacted with an aldehyde of Formula III to obtain a compound of Formula VI:

(4)

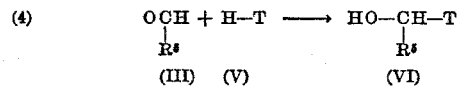

This reaction is also carried out in a suitable solvent or solvent composition. Suitable solvents are, for example, water, glacial acetic acid, formic acid, ethylene chloride, dimethylformamide, dimethylsulfoxide, alkanols having 1 to 4 carbon atoms and mixtures thereof.

Rather drastic reaction requirements, e.g., temperatures of up to 150° C. and above, may be selected so that even compounds of Formula V which are difficult to dissolve and/or slow to react may be converted.

Subsequently, the compound of Formula VI, if necessary after its isolation, is reacted with a sulfinic acid of Formula II in a suitable solvent under mild reaction conditions:

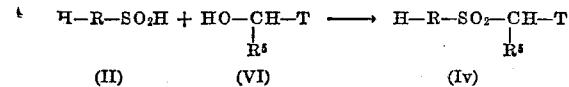

In this reaction, the solvents may be, for example, water, alkanols having 1 to 4 carbon atoms, formic acid, glacial acetic acid, dimethylformamide, dimethylsulfoxide and mixtures thereof.

The reaction temperatures for the reaction of Compound VI with the sulfinic acids are normally between 0 and +80° C.

Even with Method C, the sulfinic acid II may be used in the form of a salt. In addition, in certain instances the aldehyde group may also be acetalized.

It will be apparent to one skilled in the art that compounds Ie or Ir and It and Iu may also be prepared according to Methods A, B, and C.

METHOD D

According to this method, there is obtained with aldehydes which are substituted by electron-sharing atoms or groups, e.g., chloral, bromal, p-nitrobenzaldehyde, 2,6-dichlorobenzaldehyde, 2-chloro-6 - nitrobenzaldehyde and 2-nitrobenzaldehyde, better yields than with Methods A, B or C.

Method D is identical with Method C in its first process step. In other words, an aldehyde of Formula III is first reacted with a compound of Formula V according to the reaction conditions in Method C to obtain a compound of Formula VI:

(4)

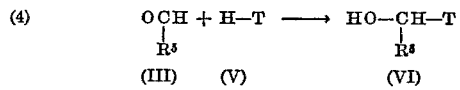

In the compound of Formula VI, the OH group is subsequently exchanged for halogen by treatment with a halogenating agent. All halogenating agents may be employed which exchange an alcoholic OH group for halogen, preferably for bromine or chlorine.

Such halogenating agents, for example, include phosphorus pentachloride, phosphorus pentabromide, phosphorus tribromide, phosphorus trichloride and phosphorus oxychloride. Preferably, thionyl halides are used, particularly thionyl bromide or thionyl chloride. The reaction with the thionyl halide, particularly with thionyl bromide or thionyl chloride, may be carried out, for example, in a suitable inert solvent such as hydrocarbon or hydrocarbon halide or even without solvent. In the halogenation, there results a compound of Formula VII:

wherein Hal is halogen, particularly chlorine or bromine.

The compound of Formula VII is isolated and reacted with an alkali salt, particularly a sodium or potassium salt, of a sulfinic acid of Formula IIb to obtain a compound of Formula Iv according to the following reaciton equation:

(5)

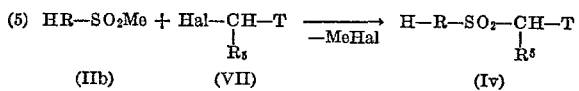

Me is an alkali metal, particularly sodium or potassium.

The reaction according to reaction Equation 5 is carried out in a suitable solvent at temperatures between about 20° C. and the boiling temperature of the solvent. Suitable solvents include, for example, acid amides such as dimethylformamide and N-methylpyrrolidone, sulfoxides such as dimethylsulfoxide, ureas such as tetramethyl urea and ethers such as dioxane and tetrahydrofuran.

The work-up may be accomplished by diluting with water after the majority of the solvent used is distilled off (under vacuum if necessary). In this connection, the compounds are precipitated in crystalline form. They may be recrystallized for further purification from a suitable solvent.

If in the Methods A, B, C or D, there is used instead of the compound of Formula V, a compound:

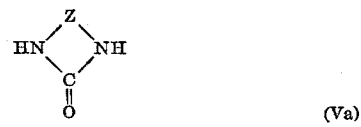

there is obtained as an end product a compound of the structure

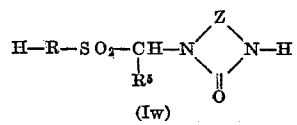

This compound may now, in turn, be used in place of Compound V in Methods A, B, C or D and then yields compounds, depending on the selection of the aldehyde and sulfinic acid components of the formulae:

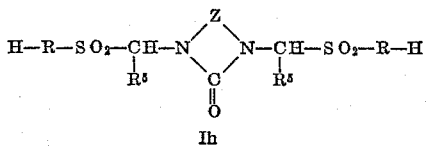

and

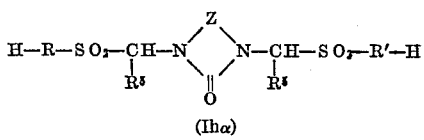
(Ihα)

Of course, there may also be prepared compounds of the formulae:

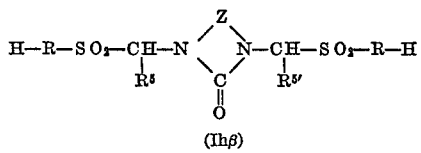
(Ihβ)

and

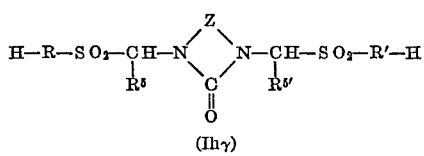
(Ihγ)

The designation R' or $R^{5'}$ indicates that these groups are not identical with the groups R or $R^5$ on the left side of the molecule.

Symmetrical compounds of Formula Ih may also be prepared according to Methods A, B, C and D, if the molar ratio is appropriately changed. For example, reaction Equation 2 of Method A would then read:

2a)
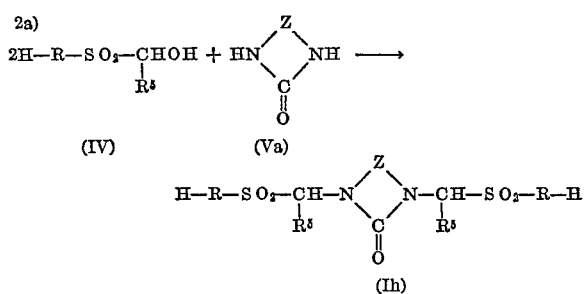

and reaction Equation 3 of Method B would then read:

(3a)
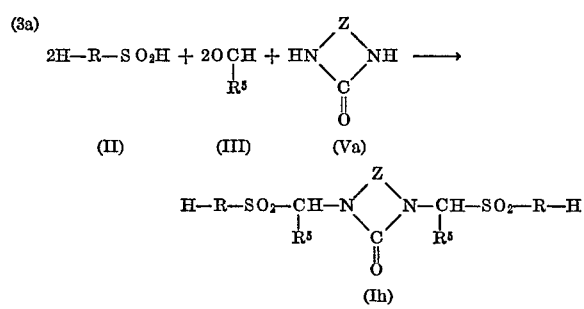

If in the reaction Equations 2a and 3a, the compound Va is replaced by a compound of one of Formulae Vb, Vc, Vd or Ve:

$H_2N$—COO—$Y^1$—OOC—$NH_2$ ------------------ Vb
$H_2N$—CO—$Y^1$—OC—$NH_2$ -------------------- Vc
$H_2N$—$SO_2$—$Y^1$—$SO_2$—$NH_2$ ------------ Vd
HS—$Y^1$—SH ------------------------------------ Ve and otherwise the procedure is exactly the same as in Methods A and B, compounds of the Formulae Ie, If, Ig and Ii are obtained. The reaction equations with the use of a compound of the Formula Vb then reads, for example:

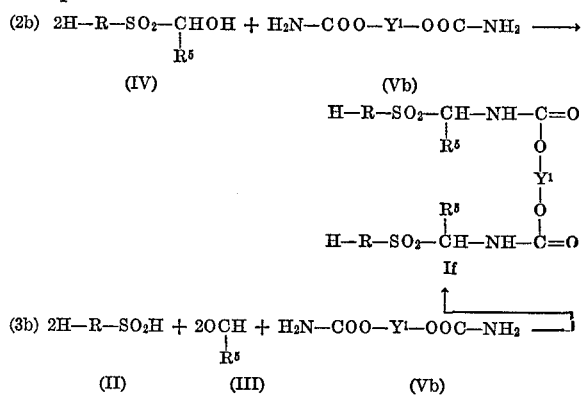

Compounds of Formulae Ie, If, Ig and Ii may also be obtained advantageously according to Method C, if compounds of the Formulae Vb, Vc, Vd and Ve are used and the reactant ratios are appropriately changed.

If in the Methods A, B or C, formaldehyde is used as aldehyde III, then compounds wherein $R^5$ is hydrogen are obtained. Preferred compounds are those wherein $R^5$ is COOH. These are obtained if according to Methods A, B or C, glyoxylic acid (OCHCOOH) is used as aldehyde III.

Compounds of the Formulae Ik, Il, Im, In and It are obtained if according to Methods A, B and C, a dialdehyde IIIa is used as the aldehyde component and the molar ratio is appropriately changed. Method A then proceeds as follows:

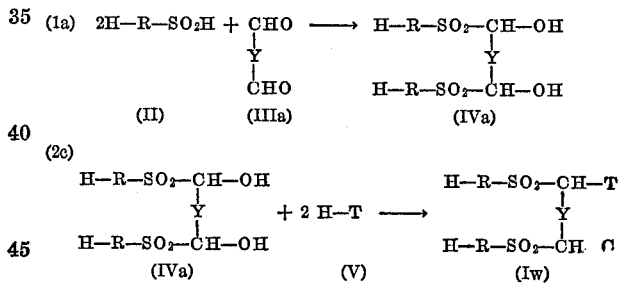

T in Equation 2c is as previously defined.

The reaction equation for Method B would then read:

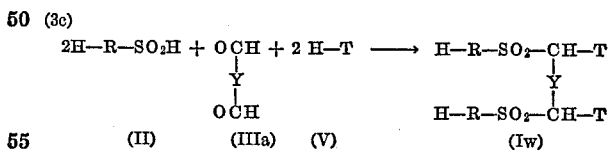

and Method C would proceed with the use of dialdehydes as follows:

(4a)
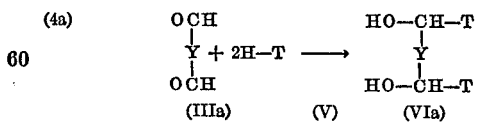

(5a)
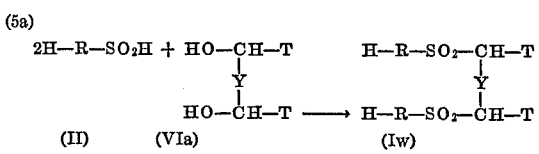

Compounds of Formulae Io, Ip, Iq, Ir and Iu are obtained according to Methods A, B and C, if in place of a sulfinic acid of Formula II, a disulfinic acid is used of Formula IIa:

$HO_2S$—R—$SO_2H$ and the molar ratio is appropriately changed. The reaction equations for Method A would then read, for example, as follows:

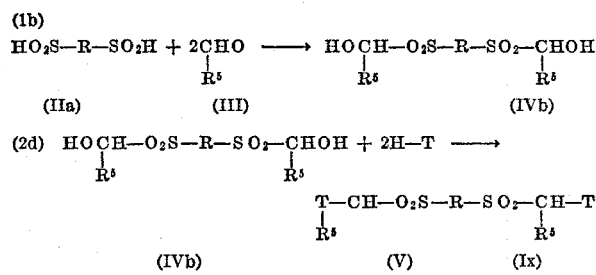

The statements made in connection with carrying out Methods A, B and C also hold true for their modifications.

Examples of sulfinic acids of Formula II include: methane-, ethane-, propane-, butane-, benzene-, p-toluene-, p-chlorobenzene-, 4-methoxybenzene-, 3-trifluoromethylbenzene-, 4-nitrobenzene-, 3-cyanobenzene-, 4-acetaminobenzene-, 3,4-dichlorobenzene-, 2,5-dichlorobenzene-, 2,6-dichlorobenzene-, 2,3,4-trichlorobenzene-, 2,5-dimethoxybenzene-, 3,4,5-trimethoxybenzene-, 2-methoxy-5-chlorobenzene-, 2-chloro - 5 - nitrobenzene-, 2-chloro-5-trifluoro methylbenzene-, 2-chloro-6-methylbenzene-, 4-hydroxy-5-carboxybenzene-, 2-thiophene- and 2-naphthaline-sulfinic acid.

As sulfinic acids of Formula IIa, there may be used, for example, the following:

benzene-1,3-disulfinic acid
benzene-1,4-disulfinic acid
4-chloro-benzene-1,3-disulfinic acid
4,6-dichlorobenzene-1,3-disulfinic acid
5-nitrobenzene-1,3-disulfinic acid
2,5-dichlorobenzene-1,3-disulfinic acid
biphenyl-4,4'-disulfinic acid.

As previously indicated, salts of sulfinic acid may also be used, particularly the sodium and potassium salts.

Sulfinic acids may be obtained, for example, either by the reduction of the corresponding sulfonic acid chlorides (these in turn are obtainable by the reaction of the corresponding substituted benzenes with chlorosulfonic acid or from the corresponding substituted anilines by a modified Sandmeyer reaction according to Meerwein—Chem. Ber. 90, 841 (1957)) or by a direct Sandmeyer reaction to the sulfinic acid. Thus, for example, the previously unknown 2-chloro-6-methylbenzene-sulfinic acid (melting point: 110° C. with decomposition) was obtained from 2-chloro-6-methylaniline via 2-chloro-6-methylbenzene sulfochloride (boiling point: 117° C. at 1.3 mm.). The preparation of sulfinic acids is summarized, for example, in Houben-Weyl, Methoden der Organischen Chemie, Vol. 9 (19), pp. 299 et. seq.

As aldehydes of Formula III, one may use, for example:

formaldehyde
acetaldehyde
propionaldehyde
n- or i-butyric aldehyde
n- or i-valeric aldehyde
caproic aldehyde
benzaldehyde
chloral
bromal
p-chlorobenzaldehyde
o-chlorobenzaldehyde
p-bromobenzaldehyde
p-methoxybenzaldehyde
o-methoxybenzaldehyde
3,4,5-trimethoxybenzaldehyde
o-hydroxybenzaldehyde
2,5-dichlorobenzaldehyde
3,4-dichlorobenzaldehyde
p-dimethylaminobenzaldehyde
p-acetylaminobenzaldehyde
tolylaldehyde
m-nitrobenzaldehyde
p-nitrobenzaldehyde
furfural
acrolein
crotonaldehyde
pyridyl-3-aldehyde
glyoxylic acid (also in the form of its salt, particularly its sodium, potassium, calcium, ammonium and triethanolammonium and triethylammonium salts).

As dialdehydes of Formula IIIa, the following may be used, for example:

glyoxal
malonic dialdehyde
succinic dialdehyde
o-phthalic aldehyde
isophthalic aldehyde
terephtalic aldehyde.

As thiols (mercaptans) of the formula $H-SR^2$, the following may be used, for example:

methane thiol
ethane thiol
propane thiol
butane thiol
β-hydroxyethane thiol
benzene thiol
p-chlorobenzene thiol
p-hydroxybenzene thiol
3,4-dichlorobenzene thiol
2-chloro-5-trifluoromethylbenzene thiol
3-trifluoromethylbenzene thiol
4-acetylaminobenzene thiol
4-dimethylaminobenzene thiol
2,3,4-trichlorobenzene thiol
4-bromobenzene thiol
2,5-dimethoxybenzene thiol
5-chloro-2-methoxybenzene thiol
1-naphthalene thiol
2-naphthalene thiol
2-chloro-6-methylbenzene thiol
4-methylbenzene thiol
phenylmethane thiol
3,4-dimethylbenzene thiol
cyclopentane thiol
p-mercaptobenzoic acid
mercaptoacetic acid
mercaptoacetic acid methylester
mercaptoacetic acid ethylester
mercaptoacetic acid propylester.

Suitable dithiols (dimercaptans) are, for example:

ethane-1,2-dithiol
benzene-1,3-dithiol
4-chlorobenzene-1,3-dithiol.

Thiols and dithiols may be prepared according to processes known per se, e.g., by the alkylation or arylation of hydrogen sulfide and by the conversion of other sulfur functions into the —SH group. In the alkylation of hydrogen sulfide, the second hydrogen atom is replaced as known for the sake of expediency by easily removable radicals. For example, sodium thiosulfate, thiourea or xanthogenates are alkylated and the alkylation products are converted into thiols by acidifying or hydrolysis. Aromatic thiols are advantageously prepared by the reduction of sulfonic acid chlorides.

Starting compounds of the formula

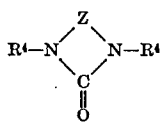

are cyclic urea or cyclic urea derivatives. The following may be used, for example:

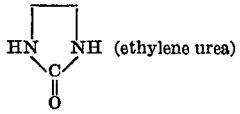 (ethylene urea)

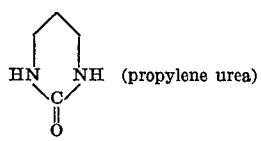 (propylene urea)

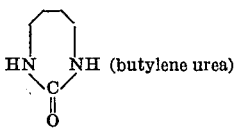 (butylene urea)

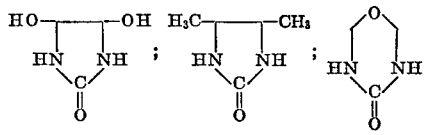

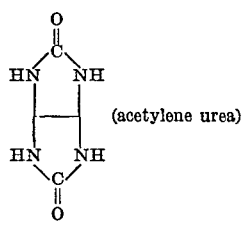 (acetylene urea)

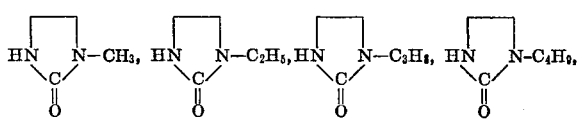

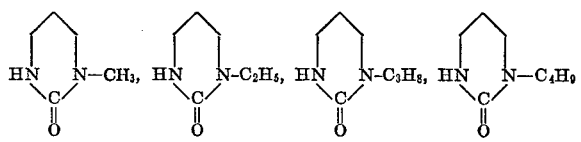

and

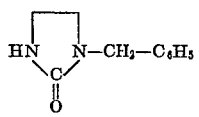

As wrinkle-resisting finishing agents, various methylolated cyclic ureas are used in commerce under trade names such as "Cassurit RI," "Cassurit LR" or "Cassurit BFR." Their structures, for example, are as follows:

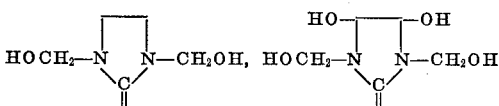

and

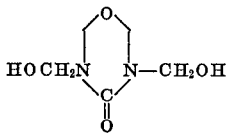

Such methylolated cyclic ureas may be directly reacted in place of Compound VI according to Method C with a sulfinic acid in a molar ratio of 2:1 as follows, for example:

(5b)
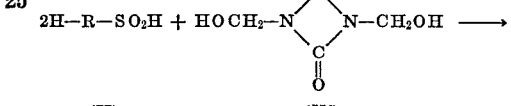

(II)         (Vf)

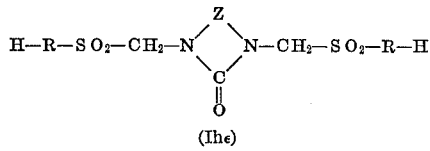

(Ihe)

Starting compounds of Formula Vb may easily be obtained, for example, from urea and a diol VII according to the methods known for the preparation of urethanes:

(6)
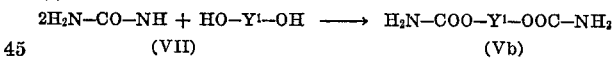
(VII)                (Vb)

As diols, the following may be used, for example:

glycol
1,3-propane-diol
1,4-butane diol
1,5-pentane diol
1,6-hexane diol
neopentyl glycol In the event $Y^1$ is an aromatic connecting member, the corresponding Vb compounds are prepared as follows:

(7a)
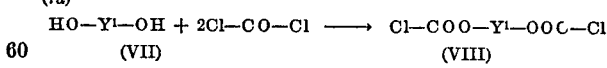
(VII)                (VIII)

(7b)
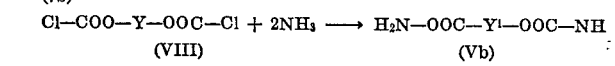
(VIII)                (Vb)

For the preparation of compounds of the Formula Id and Ik, carbonamides, $H_2N—COR^4$, are required as starting compounds. Suitable carbonamides, for example, are:

formamide
acetamide
propionamide
butyricamide
trichloracetamide
benzamide
p-tolylamide trifluoromethylbenzamide
p-cyanobenzamide
o-chlorophenoxyacetamide
p-methoxyphenoxyacetamide
phenoxyacetamide
2,5-dimethylphenoxyacetamide Suitable dicarbonamides of the formula $$H_2N-CO-Y^1-CO-NH_2$$

include, for example:

oxalic acid diamide
malonic acid diamide
succinic acid diamide
glutaric acid diamide
adipic acid diamide
pimelic acid diamide
suberic acid diamide
terephthalic acid diamide
isophthalic acid diamide
2-chloroterephthalic acid diamide
naphthalene-1,5-dicarbonic acid diamide

The carbonamides and dicarbonamides may be easily prepared, for example, by the reaction of the corresponding carbonic acid esters or acid chlorides with ammonia.

For the preparation of compounds of Formulae Ic and II, sulfonamides, $H_2N-SO_2R^2$, are needed as starting compounds. Suitable sulfonamides, for example, are:

methane sulfonamide
ethane sulfonamide
propane sulfonamide
butane sulfonamide
benzene sulfonamide
4-carboxybenzene sulfonamide
3-trifluoromethylbenzene sulfonamide
2,4-dimethoxybenzene sulfonamide
4-acetylaminobenzene sulfonamide
2,3,4-trichlorobenzene sulfonamide
3-cyanobenzene sulfonamide.

Suitable disulfonamides of the formula $$H_2N-SO_2-Y^1-SO_2-NH_2$$

for the preparation of compounds of the Formula Ig are, for example:

benzene-1,3-disulfonic acid diamide
benzene-1,4-disulfonic acid diamide
4-chlorobenzene-1,3-disulfonic acid diamide
5-nitrobenzene-1,3-disulfonic acid diamide
4,6-dichlorobenzene-1,3-disulfonic acid diamide
biphenyl-4,4'-disulfonic acid diamide.

Inasmuch as the compounds of Formula I may contain a carboxylic group, they can form salts with inorganic and organic bases. Of the inorganic salts, preferred are those with cations of the first or second main group, particularly the ammonium, sodium, potassium, calcium and copper salts. Of the salts with organic cations, those are preferred which are derived from trimethylamine, triethylamine, triethanolamine, morpholine, piperidine, pyrrolidine and aniline.

From the carboxyl-group-containing compounds of Formula I, the salts may be prepared in a manner known per se by reaction with inorganic or organic bases. In the preparation of the alkali metal and alkali earth metal salts, particularly the potassium, sodium and calcium salts, an alcoholate dissolved in alcohol is used for the sake of expediency.

Examples 1–4 illustrate the preparation of the compounds of Formula I. The symbol "—" used therein means a direct bond and "Z" means with decomposition.

EXAMPLE 1 (METHOD A)

The sodium salt of p-toluene sulfinic acid (35 g.), 200 ml. water, 30 ml. 85% formic acid and 20 ml. 39% formaldehyde are stirred in water for 3 hours at 40° C. Then 16 g. ethylene urea are added to the clear solution and stirring is continued for another 10 minutes at 40° C. and subsequently for 2 hours at 10° C. About 10 minutes after the addition of ethylene urea, the product begins to crystallize as colorless needles.

Obtained are 38.5 g. (76% of theory) of the compound

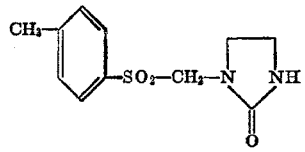

having a melting point of 158° C. (Z).

EXAMPLE 2 (METHOD B)

The sodium salt of 3,4-dichlorobenzene sulfinic acid (24 g.), 10 g. ethylene urea, 75 ml. water, 200 g. 85% formic acid and 15 g. o-chlorobenzaldehyde are dissolved to obtain a clear solution while stirring at 40° C. After 5 minutes, crystallization begins. Stirring is continued for another ½ hour at 40° C., the mixture is cooled to 10° C. and decanted. Water is employed for washing. Recrystallization may be from isopropanol.

Yield: 32 g. (77% of theory) of the compound

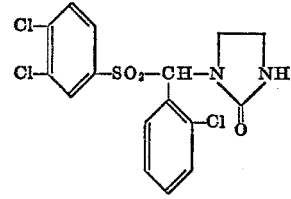

having a melting point of 161° C.

EXAMPLE 3 (METHOD C)

Propylene urea (10 g.), 40 g. glyoxylic acid (40% aqueous solution), 20 ml. of water and 10 ml. 85% formic acid are stirred for 3 hours at 80–85° C. The composition is cooled to 40° C. and a solution of 40 g. of the sodium salt of p-toluene sulfinic acid (excess) in 150 ml. water and 50 ml. 85% formic acid is added at once. After stirring for 5 hours at 40° C., 15 ml. 25% hydrochloric acid are added. The mixture is cooled to 10° C. After standing overnight, the product is crystallized out. The mixture is decanted and washed with 100 ml. ice water. The product may be recrystallized from isopropanol.

Yield: 30 g. (58% of theory) of the compound

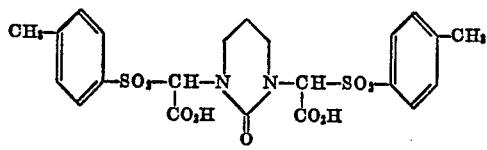

This product is easily soluble in aqueous monosodium carbonate solution.

EXAMPLE 4 (METHOD C)

The sodium salt of 3,4-dichlorobenzene sulfinic acid (25 g.), 50 ml. water, 50 ml. 85% formic acid and 15 g. of a 50% aqueous solution of dihydroxymethylethylene urea are stirred for 3 hours at 50° C. Crystallization begins after 20 minutes. After cooling to 10° C. and standing overnight, colorless needles of the compound

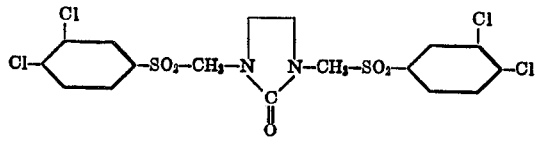

having a melting point of 210° C. (Z) are recovered and washed well with water. It may be recrystallized from dioxane.

Yield: 22.6 g. (87.5% of theory).

Analogously the following compounds are prepared:

$$H-R-SO_2-CH-SR^2$$
$$\phantom{H-R-SO_2-CH}|\phantom{SR^2}$$
$$\phantom{H-R-SO_2-CH-}R^1$$

| H—R | R¹ | R² | Melting point, °C. | Method |
|---|---|---|---|---|
| CH₃—⟨ ⟩— | ⟨ ⟩ with O—CH₂—O | —CH₂CH₂OH | 102 | C |
| Same as above | ⟨ ⟩—OCH₃ | —CH₂CH₂OH | 102 | A, C |

$$H-R-SO_2-CH-N\underset{\underset{O}{C}}{\overset{Z}{\diagup\diagdown}}N-R^4$$
$$\phantom{H-R-SO_2-CH-}|$$
$$\phantom{H-R-SO_2-CH-}R^1$$

| H—R | R¹ | Z | R⁴ | Melting point, °C. | Method |
|---|---|---|---|---|---|
| ⟨ ⟩ (Cl, CH₃) | H | —CH₂—CH₂— | H | 188 | B |
| ⟨ ⟩ (Cl, OCH₃) | H | —CH₂—CH₂— | H | 190 | B |
| ⟨ ⟩ (Cl, Cl) | H | —CH₂—CH₂— | H | 116 | B |
| Cl—⟨ ⟩— | H | —CH₂—CH₂— | H | 148 | B |
| CH₃—⟨ ⟩— | H | —CH₂—CH₂— | H | 158 | B |
| ⟨ ⟩ (Cl, Cl) | ⟨ ⟩—Cl | —CH₂—CH₂— | H | 161 | B |
| ⟨ ⟩ (Cl, OCH₃) | ⟨ ⟩—OCH₃ | —CH₂—CH₂— | H | 150 | B |
| ⟨ ⟩ (Cl, OCH₃) | ⟨ ⟩—OCH₃ | —CH₂—CH₂— | H | 148 | B |

3,803,112

$$H-R-SO_2-CH(R^1)-N-C(=O)-N-CH(R^1)-SO_2-R-H$$
(with Z on top N-N bridge)

| H—R | R¹ | Z | Melting point, °C. | Method |
|---|---|---|---|---|
| 4-CH₃-C₆H₄- | H | —CH₂—O—CH₂— | 160 (Z) | C |
| 4-Cl-C₆H₄- | 2-Cl-C₆H₄- | —CH₂—CH₂— | 175 (Z) | C |
| 3-NO₂-4-Cl-C₆H₃- | H | —CH₂—CH₂— | 180 (Z) | C |
| 3,4-(CH₃)₂-C₆H₃- | —CO₂H | —CH₂—CH₂—CH₂— | 127 (Z) | C |
| 3,4-Cl₂-C₆H₃- | H | —CH₂—CH₂— | 210 (Z) | A, C |
| 4-OCH₃-3-Cl-C₆H₃- | 2-Cl-C₆H₄- | —CH₂—CH₂— | 148 (Z) | C |
| 4-CH₃-C₆H₄- | H | —CH₂—CH₂— | 206 | C |
| Same as above | 4-OCH₃-C₆H₄- | —CH₂—CH₂— | 141 | C |
| Do | 2-Cl-C₆H₄- | —CH₂—CH₂— | 150 (Z) | C |
| 4-CH₃CONH-C₆H₄- | H | —CH₂—CH₂— | 156 | A, C |
| 3-CF₃-C₆H₄- | H | —CH₂—CH₂— | 190 | A, C |
| 4-Cl-2-OCH₃-C₆H₃- (approx) | —CO₂H | —CH₂—CH₂— | 140 (Z) | C |
| 2-thienyl | H | —CH₂—CH₂— | 180 (Z) | C |
| 2,5-(OCH₃)₂-C₆H₃- | H | —CH(OH)—CH(OH)— | 162 (Z) | B |
| 4-O₂N-C₆H₄- | H | —CH₂—CH₂— | 190 (Z) | C |

H—R—SO₂—CH—NH—COO—Y¹—OOC—NH—CH—SO₂R—H
                |                          |
                R¹                         R¹

| H—R | R¹ | Y¹ | Melting point, °C. | Method |
|---|---|---|---|---|
| CH₃–⌬–⌬–CH₃ | | —(CH₂)₂— | 174 (Z) | C |
| Same as above | H | —CH₂—C(CH₃)₂—CH₂— | 180 (Z) | C |
| Cl–⌬– | H | —(CH₂)₆— | 140 (Z) | C |
| CH₃–⌬– | H | —(CH₂)₆— | 163 (Z) | C |
| Cl–⌬– | ⌬–Cl | —CH₂CH₂— | 154 | C |

H—R—SO₂—CH—NH—SO₂—R²
           |
           Y
           |
H—R—SO₂—CH—NH—SO₂—R²

| H—R | Y | R² | Melting point, °C. | Method |
|---|---|---|---|---|
| H₃C–⌬– | -------- | ⌬–Cl | 160 (Z) | B |
| 2,4-(OCH₃)₂–⌬– | -------- | Same as above | 148 (Z) | B |
| F₃C–⌬– | ⌬– | CH₃ | 174 (Z) | C |
| 3,4-Cl₂–⌬– | —CH₂— | ⌬–NH–CO–CH₃ | 164 (Z) | C |
| NC–⌬– | —CH₂— | ⌬– | 125 (Z) | C |
| O₂N–⌬– | -------- | 3,4-(OCH₃)₂–⌬– | 144 (Z) | A |
| 2-CF₃,3-Cl–⌬– | —CH₂CH₂— | 3,4-Cl₂–⌬– | 180 (Z) | B |
| CH₃–CO–NH–⌬– | —CH₂— | ⌬–CF₃ | 154 | C |
| thienyl | -------- | ⌬–CF₃ | 178 (Z) | C |
| ⌬– | —CH₂— | naphthyl | 190 | C |
| 5-(N(CH₃)₂)-naphthyl | -------- | ⌬–CH₃ | 140 (Z) | A, C |

$$\begin{array}{c} H-R-SO_2-CH-NH-CO-R^4 \\ | \\ Y \\ | \\ H-R-SO_2-CH-NH-CO-R^4 \end{array}$$

| H—R | Y | R⁴ | Melting point, °C. | Method |
|---|---|---|---|---|
| 2-methyl-5-nitronaphthalene | ——— | phenyl | 200 (Z) | C |
| (same naphthalene) | —CH₂— | —CH₃ | 210 (Z) | C |
| 2-chloro-6-methylphenyl | ——— | —C₂H₅ | 177 (Z) | C |
| 2,3,6-trichlorophenyl | ——— | —CH₃ | 220 (Z) | C |
| 4-(trifluoromethyl)phenyl | —CH₂—CH₂— | —CH₂—C₆H₄—OCH₃ | 160 (Z) | C |
| 4-chlorophenyl | —C₆H₄— | —CH₃ | 217 (Z) | A |
| 2,5-dimethoxyphenyl | Same as above | —CH₃ | 197 (Z) | A |
| naphthyl | —CH₂— | 3,4,5-trimethoxyphenyl | 184 (Z) | A |
| 2-thienyl | ——— | —CCl₃ | 159 (Z) | C |
| 4-chloro-2-methoxyphenyl | ——— | —CH₂—C₆H₄—Cl | 190 (Z) | C |
| 4-cyanophenyl | —CH₂CH₂— | —CH₃ | 205 (Z) | B |

$$\begin{array}{c} H-R-SO_2-CH-SR^2 \\ | \\ Y \\ | \\ H-R-SO_2-CH-SR^2 \end{array}$$

| R | Y | R² | Melting point, °C. | Method |
|---|---|---|---|---|
| 4-methylphenyl | ——— | —CH₂CH₂OH | 127 (Z) | B |
| 4-nitrophenyl | —C₆H₄— | —CH₂CH₂OH | 170 (Z) | B |
| 3-nitro-4-chlorophenyl (or 4-nitro-3-chlorophenyl) | —CH₂— | —CH₂—CO—OCH₃ | 157 (Z) | C |
| CH₃—C(O)—NH—C₆H₄— | ——— | —C₆H₄—Cl | 170 (Z) | C |

TABLE—Continued

| R | Y | R² | Melting point, °C. | Method |
|---|---|---|---|---|
| 4-CF₃-C₆H₄- | -------- | 2,5-(OCH₃)₂-C₆H₃- | 194 (Z) | C |
| 4-NC-C₆H₄- | -CH₂CH₂- | -C₆H₅ | 162 (Z) | C |
| 4-Cl-2-OCH₃-C₆H₃- | -------- | -CH₂CH₂OH | 124 (Z) | C, B |
| 2-thienyl | -CH₂- | -C₄H₉(n) | 110 | C |
| 2-naphthyl | -------- | -CH₂CH₂OH | 145 (Z) | C |
| 3,4,5-Cl₃-C₆H₂- | -C₆H₄- | -C₂H₅ | 205 (Z) | C |
| C₆H₅- | -------- | 3,4-Cl₂-C₆H₃- | 200 (Z) | B, C |
| 3,4-Cl₂-C₆H₃- | -------- | 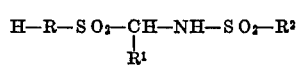 H | 135 (Z) | C |

$$H-R-SO_2-CH(R^1)-NH-SO_2-R^2$$

| R | R¹ | R² | Melting point, °C. | Method |
|---|---|---|---|---|
| 4-Cl-C₆H₄- | H | 4-(NH-CO-CH₃)-C₆H₄- | 185 (Z) | A, C |
| 4-CH₃-C₆H₄- | H | -C₆H₅ | 140 | C |
| Same as above | H | 4-CH₃-C₆H₄- | 152 | C |
| 4-Cl-C₆H₄- | H | Same as above | 148 | B |
| 3-CF₃-C₆H₄- | H | ......do...... | 143 | C |
| 4-Cl-C₆H₄- | H | ......do...... | 150 | C |
| 4-(CH₃-CO-NH)-C₆H₄- | H | ......do...... | 215 | C |
| 4-CH₃-C₆H₄- | -CO₂H | -C₆H₅ | 182 | A, C |
| 2-thienyl | -CO₂H | 3-CF₃-C₆H₄- | 136 (Z) | C |

H—R—SO₂—CH—NH—CO—R⁴
          |
          R¹

| H—R | R¹ | R⁴ | Melting point, °C. | Method |
|---|---|---|---|---|
| CH₃—⟨⟩— | —⟨⟩—OCH₃ | —CH₃ | 162 (Z) | B |
| Same as above | H | —C₆H₅ | 195 | B |
| Cl—⟨⟩— (with Cl) | H | —CH₂O—⟨⟩—OCH₃ | 151 | C |
| CH₃—⟨⟩— | —CO₂H | —CH₃ | 114 | C |
| Same as above | —CO₂H | —CH₂—O—⟨⟩—Cl | 220 (Z) | C |
| Cl—⟨⟩— | —⟨⟩—OCH₃ | Same as above | 146 (Z) | C |
| CH₃CONH—⟨⟩— | ⟨⟩ (benzodioxole) | —CH₃ | 195 (Z) | A |
| Same as above | Same as above | —CH₃O—⟨⟩—OCH₃ | 180 (Z) | A |
| Cl—⟨⟩— (with Cl) | —CO₂H | —CH₃O—⟨⟩—OCH₃ | 158 | C |
| CH₃—⟨⟩— | —⟨⟩—Cl | H | 95 (Z) | C |

The following examples illustrate the process of the present invention.

EXAMPLE 5

In a 1 liter VA autoclave, 5 g. Mersolate H, 1.5 g. disodium phosphate and 1.5 g. trisodium phosphate are dissolved while stirring in 250 ml. deionized water. The autoclave is purged of oxygen by multiple evacuation and flushing with N₂. There are then added 20 ml. of a 25% aqueous solution of dibutylaminohydrochloride, 1 ml. of an aqueous CuSO₄ solution which contains 20 γ Cu² in 1 ml., and 10 ml. of a 20% solution of a compound of the formula

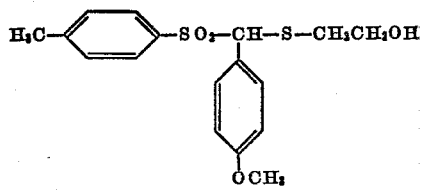

While stirring, ethylene is then introduced to a pressure of 100 atmospheres. Thereafter, 50 ml. of a 1.0% aqueous K₂S₂O₈ solution is introduced by a pump.

The temperature of the reaction mixtures is then brought to 60° C. Polymerization commences with a simultaneous pressure increase. After a 3-hour reaction time, the ethylene pressure drops from 205 to 153 atmospheres. After cooling to room temperature and releasing the pressure, 64 g. of a loose white powder is recovered by filtering.

The product has a molecular weight of 50,000 and, as evident from the IR spectrum, it is characterized by a highly linear structure. The melting point is 128° C.

EXAMPLE 6

In a 2.5 l. VA autoclave containing 200 ml. deionized water, 3.0 g. disodium phosphate, 3.0 g. trisodium phosphate and 0.3 g. dibutylaminohydrochloride are dissolved while stirring. Subsequently, 300 ml. tertiary butanol, 200 g. vinyl acetate and 0.1 ml. of a methanolic copper acetylacetonate solution which contains 12.3 γ Cu²⁺ in 0.1 ml., are added together with 3.0 g. of a compound of the formula

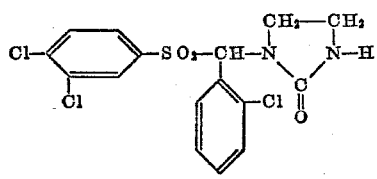

After multiple evacuation and flushing with nitrogen, the reaction mixture is heated to 40° C. and while stirring ethylene is introduced into a saturation pressure of 100 atmospheres gauge. Then, when a time span of 3 hours, 100 ml. of a 3% aqueous solution of K₂S₂O₈ is pumped in. After 6 hours, the pressure in the reaction vessel drops to 8.5 atmospheres gauge. The polymeric product is obtained in the form a highly viscous homogeneous mass. It is very suitable as an adhesive by virtue of its superior adhesion properties. Furthermore, it is distinguished by its high ethylene content of 40% by weight (spectroscopically determined).

EXAMPLE 7

Into a 3 l. polymerization flask are placed 1 liter deionized water, 0.1 ml. of a 0.001% aqueous CuSO₄ solution, 0.5 NaCl as well as 100 g. acrylonitrile. While stirring and introducing nitrogen, the reaction mixture is heated at 50° C. Then, from separate dropping funnels, 48 ml. of a 0.5% aqueous solution of $K_2S_2O_8$ and 48 ml. of a 1.0% solution of a compound of the formula

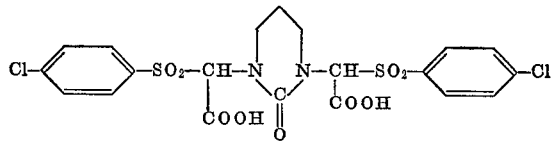

are added dropwise in a time span of 15 minutes. After reaction initiation and the temperature of the reaction mixture has risen to 60° C., there are added dropwise in the course of 1½ hours another 100 g. acrylonitrile as well as 112 ml. of a 0.5% $K_2S_2O_8$ solution and 112 ml. of a 1.0% solution of the above structurally depicted compound.

After reaction completion, stirring is continued for another 2 hours at 70° C. and subsequently at 85–90° C. saponification occurs by the addition of NaOH. The resulting highly viscous, water-soluble product is highly suitable as a migration inhibitor for the dyeing of polyester textiles.

EXAMPLE 8

In a cylindrical reaction vessel of polypropylene 250 g. acrylic acid (3.48 mol) are dissolved in 611 ml. deionized water and neutralized with 278 g. 50% sodium hydroxide (3.48 mol). After purging oxygen by the introduction of nitrogen, there are added 0.5 g. dibutylaminohydrochloride, 0.25 ml. of a methanolic copper acetylacetonate solution which contains 20 γ $Cu^{2+}$ in 0.1 ml., 0.25 g. $(NH_4)_2S_2O_8$ and 0.25 g. of a compound of the formula

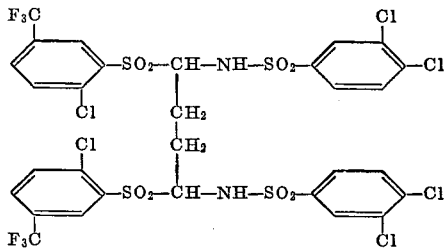

Polymerization commences at 20° C. without mechanical intermixing after about 60 minutes. The temperature of the reaction mixture rises, as a result, to a maximum of 75° C. The product is a highly viscous polymeric gelatin and is distinguished by an extraordinarily high molecular weight of $8.3 \times 10^6$.

EXAMPLE 9

There is introduced into a polymerization vessel of 2 liter capacity a mixture of 130 g. acrylic acid ethyl ester
130 g. methacrylic acid methyl ester
30 g. acrylonitrile
30 g. styrene
40 g. acrylic acid
700 ml. tertiary butanol
300 ml. deionized water
0.5 g. dibutylaminohydrochloride
1.0 g. of a compound of the formula

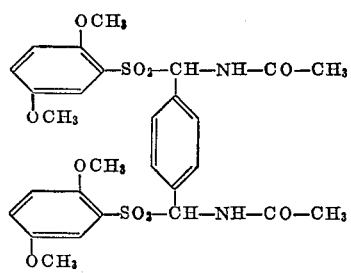

and 0.1 ml. of an aqueous $CuSO_4$ solution which contains 40 γ $Cu^{2+}$ in 1 ml.

While stirring, a solution of 2.0 g. $(NH_4)_2S_2O_8$ in 20 ml. water is added dropwise into the reaction mixture at 50° C. Polymerization commences almost instantly, the temperature of the reaction mixture rising to 70–75° C. After completion of the polymerization, a highly viscous 30% polymeric solution is obtained which is compatible with melamine resins and is distinguished by a particularly advantageous molecular weight distribution.

EXAMPLE 10

Acrylamide (250 g.) is dissolved in a mixture of 750 ml. deionized water and 0.85 g. 50% NaOH. While introducing nitrogen, there are added to this solution 0.5 g. NaCl, 0.25 ml. of a copper acetylacetonate solution (1 g. solution corresponds to 12.3 γ $Cu^{2+}$), 0.25 g. of the compound

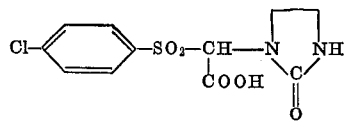

dissolved in 5 ml. 10% $NH_3$ solution and 0.25 g. ammonium peroxidisulfate.

The catalyzed reaction mixture, which is adjusted to a ethylene. After about 1¾ hours polymerization begins, the temperature of the polymerization mixture rising to 90–95° C.

There is obtained a non-flowable polymeric gel which, upon being particulated and if necessary and ground, dissolves in water without residue. The resulting highly viscous polymeric solution is outstandingly suitable as a flocculation agent.

The relative viscosity of a 0.05% solution in 1 N $NaNO_3$ at 25° C. is 1.56.

EXAMPLE 11

Into a glass polymerization vessel equipped with stirrer, thermometer, reflux cooler and dropping funnel is introduced a mixture of 90 g. n-butanol, 30 g. butylacrylate, 10 g. methylacrylate, 20 g. styrene, 12 g. acrylic acid and 10 g. hydroxyethylmethacrylate. While stirring, there are added 2 g. of a compound of the formula

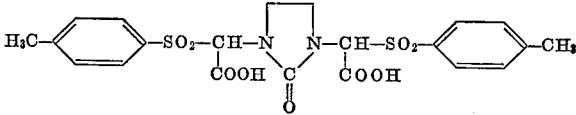

0.1 g. dibutylaminohydrochloride and 1 ml. of an alcoholic solution of copper acetylacetonate (0.1 ml. solution corresponds to 12.3 γ $Cu^{2+}$).

After the air has been displaced by nitrogen, the mixture is heated to 80° C. and there is added dropwise within 2 hours a solution of 2 g. tertiary butylhydroperoxide (70%) dissolved in 10 ml. n-butanol. After another 5¾ hours, polymerization is complete. The clear polymeric solution obtained contains 49.5% polymer by weight and has a viscosity of 4,000 cp.

In an analogous manner, the following compounds have been shown to be suitable as catalyst components:

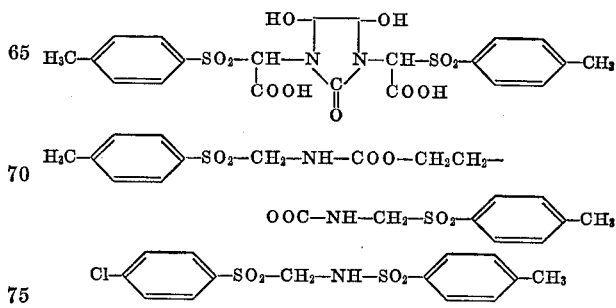

EXAMPLE 12

In a 2.5 l. VA autoclave equipped with stirrer, water jacket and temperature gauge, there are emulsified 1100 g. vinyl acetate in a solution consisting of 34 g. Marlophen 820, 17 g. Marlophen 88, 6.0 g. of the sodium salt of vinylsulfonic acid, 1.6 g. sodium lauryl sulfate, 2.6 g. citric acid and 1.5 g. disodium phosphate in 1 liter deionized water while stirring. The autoclave is multiply flushed with nitrogen in order to displace all of the oxygen. Dibutylaminohydrochloride (1 g.), 0.3 g. of a 0.01% aqueous CuSO$_4$ solution and 2 g. of a compound of the formula

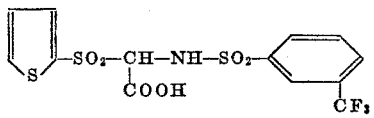

dissolved in 5 ml. 10% sodium carbonate solution are then added. The reaction mixture is then heated to 50° C. and during the heating period, ethylene is introduced to a saturation pressure of 40 atmospheres gauge while stirring. By the addition of a 5% aqueous solution of ammonium peroxidisulfate, polymerization is initiated. In the course of 5 hours, 500 ml. of the persulfate solution are added. Consequently, stirring is continued for one more hour and then the polymerization mixture is cooled to room temperature. The thusly obtained latex has a solids content of 40.3%. The ethylene content of the copolymer is 16.7.

EXAMPLE 13

Into a polymerization vessel fitted with stirrer, reflux cooler, 2 intakes and water bath is placed a mixture of 100 g. acrylonitrile, 1200 ml. deionized water and 1.0 ml. aqueous 0.01% CuSO$_4$ solution. After displacement of air by the introduction of nitrogen, there are added 1 g. NaCl and 1.0 g. of a compound of the formula

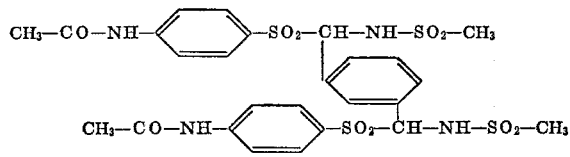

dissolved in 2 ml. dimethylsulfoxide. The temperature of the mixture is then brought to 50° C. and, at this point, there is added dropwise a 0.5% aqueous solution of K$_2$S$_2$O$_8$. As soon as the reaction has begun (about 10 min.) and the temperature has risen to about 55–58° C. in the reaction mixture, more acrylonitrile is supplied from a storage vessel in such a manner that the reaction temperature is maintained between 57 and 60° C. In this manner are added 150 ml. potassium peroxidisulfate solution and 100 ml. acrylonitrile in the course of about 1½ hours. Stirring is continued for 1 hour at 65° C. upon the completion of the polymerization. The polymer is recovered by filtering and drying. It has a K factor of 86.7 measured in dimethylformamide.

Examples 14–52 relate to the preparation of decorative and/or protective coatings.

EXAMPLE 14

There is introduced into a test tube 2 g. methacrylic acid methyl ester, 0.1 ml. of a methanolic accelerating solution with a content of 0.3 mg. cupric chloride dihydrate, 2 mg. dibutylaminohydrochloride and 0.1 g. of the catalyst

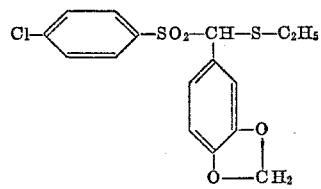

dissolved in 0.25 ml. dimethylformamide. Then 1 g. polymeric methacrylic acid methyl ester is added in bead form. The reaction mixture is stirred for several seconds and then applied to a glass plate at a thickness of 1.8 mm. Upon cooling (about 40 minutes), the colorless polymeric coating is non-tacky.

If, for the preparation of the accelerating solution (or suspension), other metal compounds are used in the same quantity in place of cupric chloride dihydrate, similar results are achieved.

EXAMPLE 15

A polyester is prepared in the following way:

| | G. |
|---|---|
| 1.2 propylene glycol | 30 |
| Maleic acid anhydride | 23 |
| Phthalic acid anhydride | 17 | are condensed at a temperature of 180–190° C. for eight hours in the presence of a trace of hydroquinone. Then the whole is cooled to 120° C. and 30 g. methylmethacrylate are introduced while stirring. After further cooling down to room temperature, the said polyester is obtained having an acid number of 18 and an OH number of 20. Of this polyester there are introduced 15 g. into a beaker and 0.5 g. of the catalyst

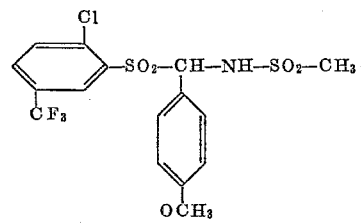

dissolved in 1.3 ml. dimethylformamide and 0.5 ml. commercial octa-soligen-cobalt-6-solution with 6% cobalt as the accelerating solution. Subsequently a 2.0 mm. thick coating is applied to a glass plate. The thusly obtained coating is completely polymerized after about 1½ hours and is non-tacky.

In comparison thereto, polymerization with benzoylperoxide and octa-soligen-cobalt-6-solution results in a non-tacky surface only after about 5 days.

EXAMPLE 16

In a solution of 0.1 g. commercial cobalt naphthenate paste with 12% cobalt in 0.4 ml. methylmethacrylate is employed as the accelerating solution in place of the octa-soligen-cobalt-6-solution described in Example 15, and if the procedure otherwise is the same as given in Example 15, there is obtained a practically non-tacky film after about 3 hours.

In comparison, thereto, polymerization with benzoyl peroxide and cobalt naphthenate requires 2 days to obtain non-tacky surface.

EXAMPLE 17

Into a test tube are introduced 2 g. methacrylic acid methyl ester, 0.1 ml. of a methanolic accelerating solution with a content of 0.3 mg. cupric chloride dihydrate, 2 mg. sodium bromide and 0.05 g. of the catalyst

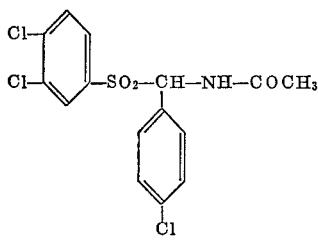

dissolved in 0.13 ml. dimethylformamide. Then 1 g. polymeric methacrylic acid methyl ester is added in bead form. The reaction mixture is then stirred for several seconds and is then applied to a copper plate at a thickness of 1.5 mm. Upon cooling, there is obtained a colorless, non-tacky polymeric coating.

Similar results are obtained if other salts in the same quantity are used in place of sodium bromide for the preparation of the accelerating solution (or suspension).

Particularly well suited are alkali metal and ammonium salts such as lithium chloride, sodium chloride, sodium iodide, sodium cyanide, potassium chloride, potassium bromide, potassium iodide, potassium permanganate, potassium rhodanide, potassium fluoride, rubidium carbonate, ammonium acetate, ammonium carbonate, ammonium hydrogen carbonate, ammonium formate and ammonium sulfate.

EXAMPLE 18

If in place of the catalyst described in Example 14, one uses 0.1 g.

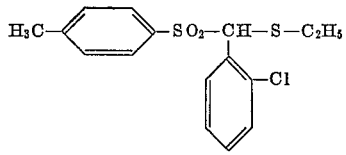

as catalyst and if in other respects the procedure is the same as in Example 14, then after about 40 minutes there is obtained a colorless and non-tacky polymeric coating.

EXAMPLE 19

If in place of the catalyst described in Example 14, one uses 0.1 g.

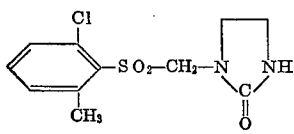

as catalyst and if in other respects the procedure is the same as in Example 14, then after 1¾ hours there is obtained a colorless and non-tacky polymeric coating.

EXAMPLE 20

If in place of the catalyst described in Example 14, one uses 0.1 g.

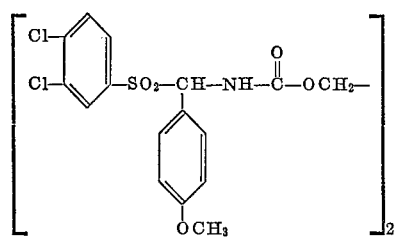

as catalyst and if in other respects the procedure is the same as in Example 14, after about 1 hour there is obtained a colorless and non-tacky polymeric coating.

EXAMPLE 21

There is introduced into a beaker 15 g. commercial unsaturated styrene-containing polyester (Roskydal 500B of Farbenfabriken Bayer AG), 0.5 g.

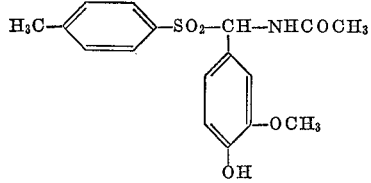

dissolved in 1.3 ml. dimethylformamide and 0.5 ml. octa-soligen-cobalt-6-solution with 6% cobalt as the accelerating solution. The reaction mixture is stirred well and subsequently a 0.15 mm. thick film is applied to a glass plate. The thusly obtained film is non-tacky after one hour.

EXAMPLE 22

There is introduced into a test tube 2 g. methacrylic acid methyl ester, 0.1 ml. of a methanolic accelerating solution with a content of 0.3 mg. cupric chloride dihydrate, 1 mg. hydrogen chloride and 0.1 g. of the catalyst

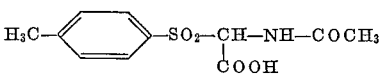

dissolved (or suspended) in 0.25 ml. dimethylformamide. Then 1 g. polymeric methacrylic acid methyl ester is added in bead form. The reaction mixture is stirred for several seconds and then applied at a coating thickness of 1.2 mm. to an iron sheet. Upon cooling, there is obtained a colorless and non-tacky polymeric coating.

EXAMPLE 23

There is introduced into a beaker 15.0 g. of the unsaturated, methylmethacrylate-containing polyester described in Example 15, 0.2 g. of the catalyst

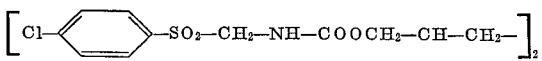

suspended in 0.6 ml. dimethylformamide, 0.6 ml. commercial octa-soligen-cobalt-6-solution with 6% cobalt and 5.0 g. titanium white RN 57. The reaction mixture is stirred for several seconds and then applied as a 1.0 mm. thick layer to a glass plate. The thusly obtained white coating is completely polymerized and non-tacky after about 1¼ hours.

EXAMPLE 24

If in place of the catalyst described in Example 21 one uses 0.5 g.

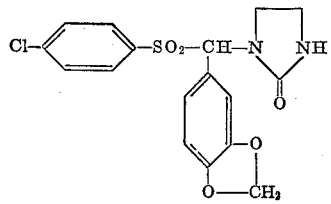

and in other respects the procedure is the same as given in Example 21, there is obtained after about 2 hours a non-tacky film.

EXAMPLE 25

If in place of the catalyst described in Example 21 one uses 0.5 g.

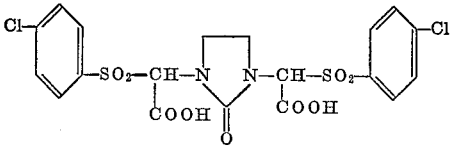

and in other respects the procedure is the same as stated in Example 21, there is obtained after about 1½ hours a non-tacky film.

EXAMPLE 26

If in place of the catalyst described in Example 14, one uses 0.1 g.

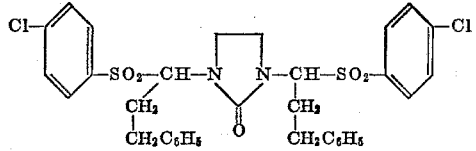

and in other respects the procedure is the same as in Example 14, there is obtained, after cooling, a colorless and non-tacky polymeric coating.

EXAMPLE 27

If in place of the catalyst described in Example 14, one uses 0.1 g.

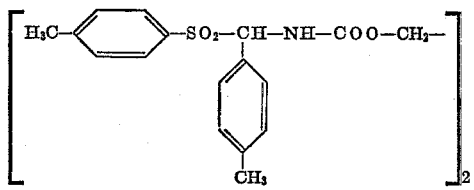

and in other respects the procedure is the same as in Example 14, there is obtained, after cooling, a colorless and non-tacky polymeric coating.

EXAMPLE 28

If in place of the catalyst described in Example 14, one uses 0.1 g.

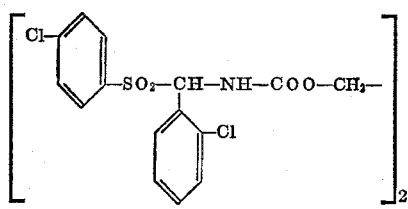

and in other respects the procedure is the same as in Example 14, there is obtained, after cooling, a colorless and non-tacky polymeric coating.

EXAMPLE 29

If in place of the catalyst described in Example 14, one uses 0.1 g.

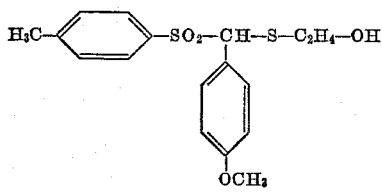

and in other respects the procedure is the same as in Example 14, after 1 hour a maximum temperature of 45° C. is reached. Upon cooling (about 1½ hours), there is obtained a colorless, non-tacky polymeric coating.

EXAMPLE 30

If in place of the catalyst described in Example 14, one uses 0.1 g.

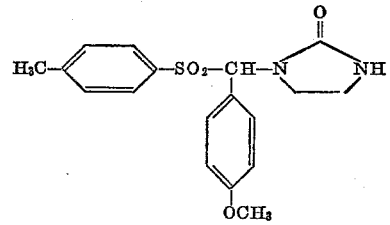

and in other respects the procedure is the same as in Example 14, then upon cooling, a colorless and non-tacky polymeric coating is obtained.

EXAMPLE 31

If in place of the catalyst described in Example 14, one uses 0.1 g.

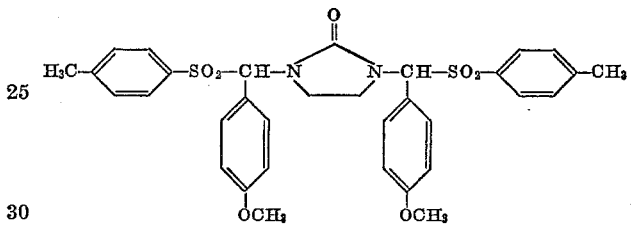

and in other respects the procedure is the same as in Example 14, then upon cooling (about 1¾ hours), a colorless and non-tacky polymeric coating is obtained.

EXAMPLE 32

There is introduced into a beaker 5.0 g. titanium white RN 57, 5.8 g. finely pulverized polymeric vinyl toluene octyl acrylate, 9.2 g. methacrylic acid methyl ester, 0.4 g. of the catalyst

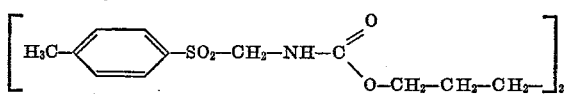

suspended in 1 ml. dimethylformamide, 0.4 ml. of a methanolic accelerating solution with a content of 0.8 mg. cupric chloride dihydrate and 8 mg. dibutylaminohydrochloride. The reaction mixture is stirred for several seconds and then applied as a 2.0 mm. thick coating on a glass plate. The thusly obtained coating is completely polymerized and non-tacky after about 1 hour.

EXAMPLE 33

There is introduced into a beaker 9.2 g. methacrylic acid methyl ester, 0.2 g. of the catalyst

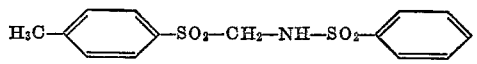

suspended in 1 ml. dimethylformamide, 0.2 g. 50% benzoyl peroxide paste, 0.4 ml. of a methanolic accelerating solution with a content of 0.4 mg. cupric chloride dihydrate and 8 mg. dibutylaminohydrochloride, 5.8 g. finely pulverized polymeric methacrylic acid methyl ester and 5.0 g. titanium white RN 57. The reaction mixture is stirred for several seconds and then applied as a 2.0 mm. thick coating on a glass plate. The thusly obtained coating is completely polymerized and non-tacky in about 20 minutes.

EXAMPLE 34

If 5.8 g. finely pulverized polyvinyl acetate is used as the polymeric material in place of the polymeric vinyl toluene octyl acrylate described in Example 32 and in other respects the procedure is the same as in Example 32, there is obtained after about 1 hour a polymerized, non-tacky coating.

EXAMPLE 35

If 5.8 g. finely pulverized polystyrene is used as the polymeric material in place of the polymeric vinyl toluene octyl acrylate described in Example 32 and n other respects the procedure is the same as in Example 32, there is obtained after about 1 hour a polymerized, non-tacky coating.

EXAMPLE 36

If 5.8 g. polymethylmethacrylate is used as the polymeric material in place of the polymeric vinyl toluene octyl acrylate described in Example 32 and in other respects the procedure is the same as in Example 32, there is obtained after about 25 minutes a polymerized, non-tacky coating.

EXAMPLE 37

If in place of the catalyst described in Example 21, one uses 0.5 g.

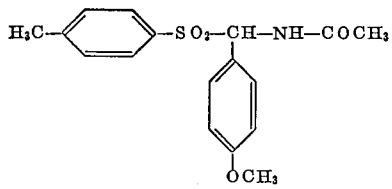

and in other respects the procedure is the same as in Example 21, then after about 1 hour, a non-tacky film is obtained.

EXAMPLE 38

If in place of the catalyst described in Example 21, one uses 0.5 g.

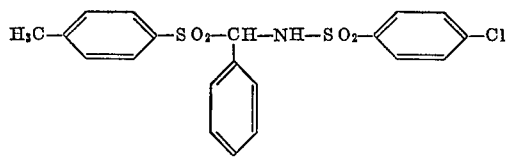

and in other respects the procedure is the same as in Example 21, after about 1¾ hours a non-tacky film is obtained.

EXAMPLE 39

If in place of the catalyst described in Example 21, one uses 0.5 g.

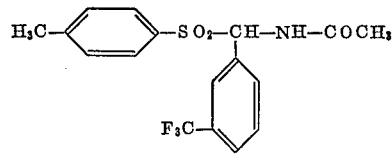

and in other respects the procedure is the same as in Example 21, after about 2 hours a non-tacky film is obtained.

EXAMPLE 40

There is introduced into a beaker 8.0 g. methacrylic acid methyl ester, 0.4 g. of the catalyst

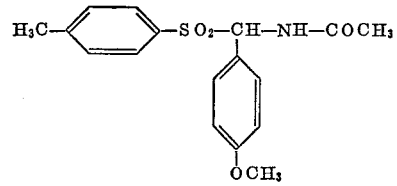

0.6 ml. of a methanolic accelerating solution with a content of 1.8 mg. cupric chloride dihydrate and 12 mg. dibutylaminohydrochloride, 4.0 g. finely pulverized polymeric methacrylic acid methyl ester and 4.0 g. titanium white RN 57. The reaction mixture is stirred for several seconds and then is applied as a 2.0 mm. thick coating on a glass plate. The thusly obtained white coating is completely polymerized and non-tacky after about 25 minutes.

EXAMPLE 41

Into a beaker are introduced 5.0 g. of the unsaturated methylmethacrylate-containing polyester described in Example 15, 5.0 g. methylmethacrylate, 0.4 g. of the catalyst

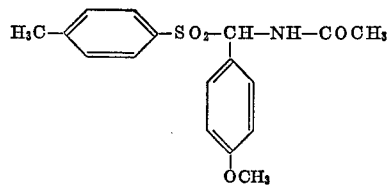

dissolved in 1 ml. dimethylformamide, 0.4 ml. of a methanolic accelerating solution with a content of 1.2 mg. cupric chloride dihydrate and 8 mg. dibutylaminohydrochloride, 5.0 g. finely pulverized, polymeric methacrylic acid methyl ester and 5.0 g. nickel titanium yellow A. The reaction mixture is stirred for several seconds and then is applied as a 2.0 mm. thick coating on a glass plate. The thusly obtained yellow coating is completely polymerized and non-tacky after about 25 minutes.

EXAMPLE 42

If in place of the catalyst described in Example 40, one uses 0.4 g.

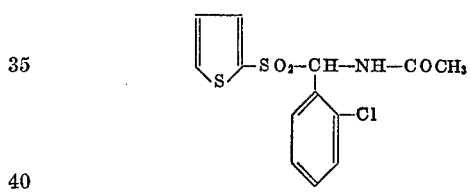

and in other respects the procedure is the same as given in Example 40, there is obtained after about ½ hour a white coating which is completely polymerized and non-tacky.

EXAMPLE 43

If in place of the catalyst described in Example 40, one uses 0.4 g.

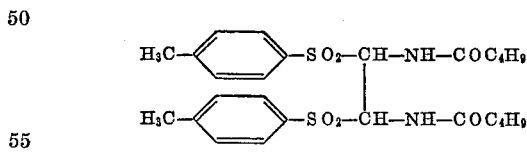

and in other respects the procedure is the same as given in Example 40, there is obtained after about ½ hour a white coating which is completely polymerized and non-tacky.

EXAMPLE 44

If in place of the catalyst described in Example 40, one uses 0.4 g.

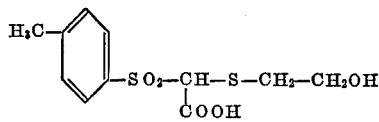

and in other respects the procedure is the same as given in Example 40, there is obtained after about 1 hour a white coating which is polymerized and non-tacky.

EXAMPLE 45

If in place of the catalyst described in Example 40, one uses 0.4 g.

Cl—C₆H₄—SO₂—CH(—NH—COCH₃)—(C₆H₅)—SO₂—CH—NH—COCH₃ and in other respects the procedure is the same as given in Example 40, after about ¾ hour there is obtained a white coating which is completely polymerized and non-tacky.

EXAMPLE 46

Into a beaker are introduced 5.0 g. of the unsaturated, methylmethacrylate-containing polyester described in Example 15, 5.0 g. methylmethacrylate, 0.4 g. of the catalyst

H₃C—C₆H₄—SO₂—CH(—NH—COCH₃)—C₆H₃(—OCH₃)(—OH)

suspended in 1 ml. dimethylformamide, 0.4 ml. of a methanolic accelerating solution with a content of 1.2 mg. cupric chloride dihydrate and 8 mg. dibutylaminohydrochloride, 5.0 g. finely pulverized, polymeric methacrylic acid methyl ester and 5.0 g. titanium white RN 57. The reaction mixture is stirred for several seconds and then applied to a glass plate as a 1.0 mm. thick coating. The thusly obtained white coating is polymerized and non-tacky after about 20 minutes.

EXAMPLE 47

If in place of the catalyst described in Example 46, one uses 0.4 g.

Cl—C₆H₄—SO₂—CH—NH—CO—C₆H₅ with a C₆H₄—Cl substituent and in other respects the procedure is the same as in Example 46, there is obtained after about ¾ hour a non-tacky, white coating.

EXAMPLE 48

If in place of the catalyst described in Example 46, one uses 0.4 g.

H₃C—C₆H₄—SO₂—CH—NH—COCH₃ with a C₆H₄—OCH₃ substituent and in other respects the procedure is the same as in Example 46, there is obtained after about 25 minutes a non-tacky white coating.

EXAMPLE 49

If in place of the catalyst described in Example 46, one uses 0.4 g.

C₆H₄(CF₃)—SO₂—CH—NH—COCH₃ with methylenedioxyphenyl substituent and in other respects the procedure is the same as in Example 46, there is obtained after about ½ hour a non-tacky, white coating.

EXAMPLE 50

If in place of the catalyst described in Example 46, one uses 0.4 g.

H₃C—C₆H₄—SO₂—CH₂—NH—SO₂—C₆H₄—CH₃ and in other respects the procedure is the same as in Example 46, there is obtained after about 25 minutes a non-tacky, white coating.

EXAMPLE 51

If in place of the catalyst described in Example 46, on uses 0.4 g.

C₆H₄(CF₃)—SO₂—CH—NH—SO₂—CH₃ with C₆H₄—Cl substituent and in other respects the procedure is the same as in Example 46, there is obtained after about 35 minutes a non-tacky, white coating.

EXAMPLE 52

Into a beaker are introduced 15.0 g. of the unsaturated, methylmethacrylate-containing polyester described in Example 15, 0.2 g. of the catalyst H₃C—C₆H₄—SO₂—CH—NH—SO₂—CH₃ with C₆H₄—OCH₃ substituent dissolved in 0.6 ml. dimethylformamide, 0.4 g. 50% benzoyl peroxide paste and, as the accelerating solution, 0.2 ml. 20% N,N-dimethyl-p-toluidine solution in methylmethacrylate.

The reaction mixture is stirred for several seconds and then applied to a glass plate as a 2.0 mm. thick coating. The thusly obtained coating is completely polymerized and practically non-tacky after about 10 minutes.

In comparison thereto, polymerization with benzoyl peroxide and N,N-dimethyl-p-toluidine requires 12 hours to obtain a practically non-tacky surface.

Example 53 relates to the preparation of the compounds of Formula I in accordance with Method D.

EXAMPLE 53

A mixture of 120 g. acetamide (2 mol), 1 liter ethylene chloride and 292 g. chloral is boiled at reflux for 5 hours. The composition is cooled to 0° C. and upon completion of crystallization, there are obtained 340 g. (82.5% of theory) colorless crystals of the compound HO—CH(CCl₃)—NH—C(=O)—CH₃ i.e., N-(2,2,2-trichloro - 1 - hydroxyethyl) - acetamide, having a melting point of 188° C.

A mixture of 206 g. (1 mol) of said acetamide, 400 ml. chloroform, 200 ml. thionylchloride and 5 ml. dimethylformamide is boiled at reflux for 5 hours. Subsequently, the chloroform and excess thionylchloride are distilled off. An oil remains behind, which is recrystallized from ethylene chloride. There is obtained 133 g. colorless crystals having a melting point of 123° C. (60% of theory) of the compound N - 1,2,2,2 - tetrachloroethylacetamide. A further fraction may be obtained from the mother liquor.

22.4 g. N-1,2,2,2-tetracycloethyl acetamide, 200 ml. dimethylsulfoxide and 30 g. of the sodium salt of 2,5-dimethoxybenzenesulfinic acid are stirred for 8 hours at 70° C. Under vacuum (about 1 mm. Hg), 150 ml. dimethylsulfoxide are distilled off and the residue is mixed with 400 ml. ice water. There are recovered 36 g. colorless crystals (92.5% of theory) having a melting point of 158–170° C. These are recrystallized from isopropanol and yield 26 g. colorless crystals (67% of theory) of the compound

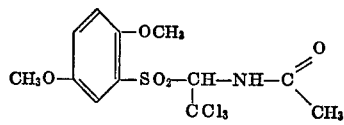

having a melting point of 184° C. (Z).

In the same manner are prepared:

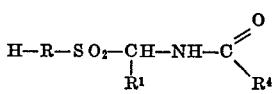

| H—R | $R^1$ | $R^4$ | Melting point, ° C. | Yield, percent |
|---|---|---|---|---|
| 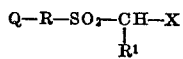 | —CCl$_3$ | CH$_3$ | 153 | 77 |
| | —CCl$_3$ | H | 110 (Z) | 60 |
| | | C$_2$H$_5$ | 144 (Z) | 80 |
| | NO$_2$ —CCl$_3$ | CH$_3$ | 112 (Z) | 64 |
| 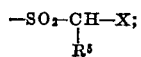 | | CH$_3$ | 148 (Z) | 72 |

We claim:

1. In the process for producing homopolymers and copolymers from olefinically unsaturated monomers in the presence of a redox catalyst system, the improvement comprising using (1) as reducing component in the redox catalyst system a compound of the formula $$Q-R-SO_2-\underset{R^1}{CH}-X$$

wherein
R is an arylene, aralkylene, hetarylene, alkylene, cycloalkylene, alkenylene, cycloalkylene or alkinylene radical;
Q is hydrogen or $$-SO_2-\underset{R^5}{CH}-X;$$

$R^5$ is hydrogen, a carboxylate base addition salt radical or an aryl, aralkyl, hetaryl, alkyl, cyclo-alkyl, alkenyl, cycloalkenyl, alkinyl, carboxyl, —COOR$^2$, —CONH$_2$,

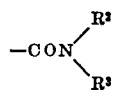

or —CN radical;
X is —NHCOR$^4$, —NHSO$_2$R$^2$, —SR$^2$, —S—COOH, —S—CONH$_2$,

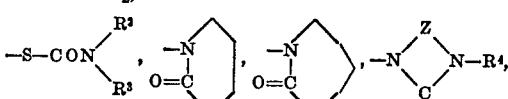

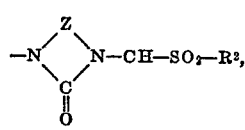

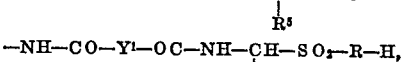

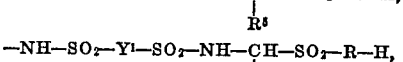

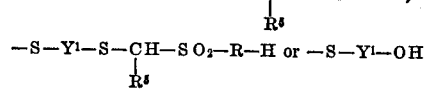

$R^2$ and $R^3$ are separately an aryl, aralkyl, hetaryl, alkyl, cycloalkyl, alkenyl, cycloalkenyl or alkinyl radical;
$R^4$ is defined by the group defining $R^2$ and $R^3$ or may also be hydrogen;
$Y^1$ is an alkylene, cycloalkylene or arylene radical;
Y is defined by the group defining $Y^1$ or may also be a direct bond;
Z is an alkylene, hydroxyalkylene or

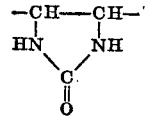

radical and
$R^1$ is defined by the group defining $R^5$ or may also be the radical $$-H-R-SO_2-\underset{}{\overset{Y}{CH}}-X$$

when Q is hydrogen and (2) as the oxidizing component a member selected from the group consisting of oxygen and inorganic and organic per compounds.

2. The process of claim 1 wherein the reducing component is of the formula

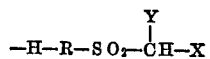

3. The process of claim 2 wherein said compound is of the formula

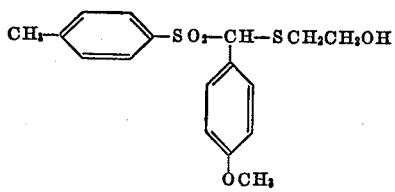

4. The process of claim 1 wherein the reducing component is of the formula

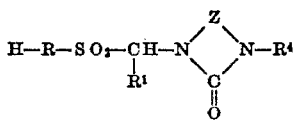

5. The process of claim 1 wherein the reducing component is of the formula

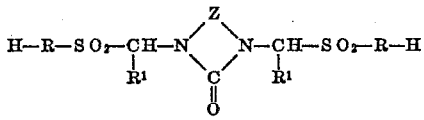

6. The process of claim 1 wherein the reducing component is of the formula

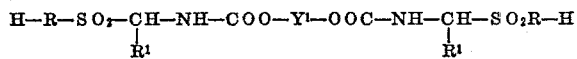

7. The process of claim 1 wherein the reducing component is of the formula

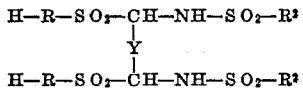

8. The process of claim 1 wherein the reducing component is of the formula

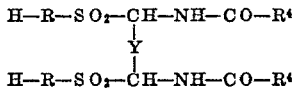

9. The process of claim 1 wherein the reducing component is of the formula

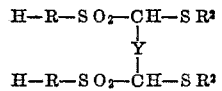

10. The process of claim 1 wherein the reducing component is of the formula

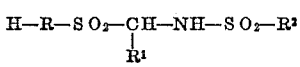

11. The process of claim 1 wherein the reducing component is of the formula

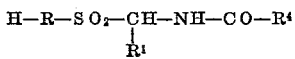

12. The process of claim 1 wherein acrylamide is homopolymerized.

References Cited
UNITED STATES PATENTS 2,768,156  10/1956  Bredereck et al. ___ 260—89.7 R
3,476,717  11/1969  Von Brachel et al. _ 260—89.7 R JOSEPH L. SCHOFER, Primary Examiner
A. HOLLER, Assistant Examiner U.S. Cl. X.R.

252—426, 438, 439; 260—80.75, 80.80, 87.3, 89.1, 89.5 AW, 94.9 R, 872, 885